UNITED STATES PATENT OFFICE.

ADOLPH S. GUNDERSEN, OF OAKLAND, CALIFORNIA.

PROCESS OF CASE-HARDENING COPPER.

1,372,423.　　　　Specification of Letters Patent.　　Patented Mar. 22, 1921.

No Drawing.　　Application filed December 1, 1915. Serial No. 64,529.

*To all whom it may concern:*

Be it known that I, ADOLPH S. GUNDERSEN, a citizen of the United States, residing at Oakland, in the county of Alameda and State of California, have invented certain new and useful Improvements in Processes of Case-Hardening Copper; and I do hereby declare the following to be a full, clear, and exact description of the invention, such as will enable others skilled in the art to which it appertains to make and use the same.

This invention relates to a process for the case hardening of copper.

An object of this invention is to provide a means for hardening the exterior surface or case of copper by forming an alloy upon the surface of copper with zinc which gives a brass surface, and to specifically provide a means for treating the same. While zinc has been used heretofore in the treatment of the surface of copper, the generic part of my invention is in the temperature used.

In this process I heat the copper in a closed receptacle in the presence of zinc, at a temperature above the melting point of zinc and below the melting point of copper, normally at a temperature of substantially 1300 to 1350° F. Specifically, in carrying out my process, an iron box is preferably employed for containing the copper to be hardened. Both powdered zinc and finely cut particles of solid zinc are employed, the solid zinc consisting of sheet zinc cut to the size of pin heads. Also rice and pearline powder are used but analogous ingredients may be substituted for these elements. In the heating operation a clean gas or charcoal fire is employed.

Zinc powder is mixed slightly with rice and the solid zinc particles are preferably obtained by cutting sheet zinc into small pieces about pin head size and the solid particles of zinc are sprinkled slightly with pearline powder. The zinc and the rice are placed in the cast iron box and the copper to be hardened is placed on top of the zinc and sprinkled lightly with the pearline powder; then the box is filled with rice and fine particles of zinc. Heat at a temperature of 1300 to 1350 degrees Fahrenheit is then applied to the box containing the copper and the said ingredients for about an hour, after which the articles of copper are permitted to cool to a bluish color or flat-iron heat slowly. The copper is then chilled in water and will be found to possess hardness to a great degree.

The pearline hereinbefore referred to is a mixture of grease, caustic soda, soda ash, and rosin.

In carrying out my process, the rice powder acts as a medium whereby the heat is retained in the copper while in the furnace.

I claim—

A process of case hardening copper, comprising exposing the surface of said copper to zinc at a temperature above the melting point of zinc and below the melting point of copper.

In testimony whereof I affix my signature in presence of two witnesses.

ADOLPH S. GUNDERSEN.

Witnesses:
　G. CARTER,
　R. BRADLEY.